J. B. BOYER.
NOODLE CUTTER.
APPLICATION FILED MAY 17, 1909.
963,682.
Patented July 5, 1910.
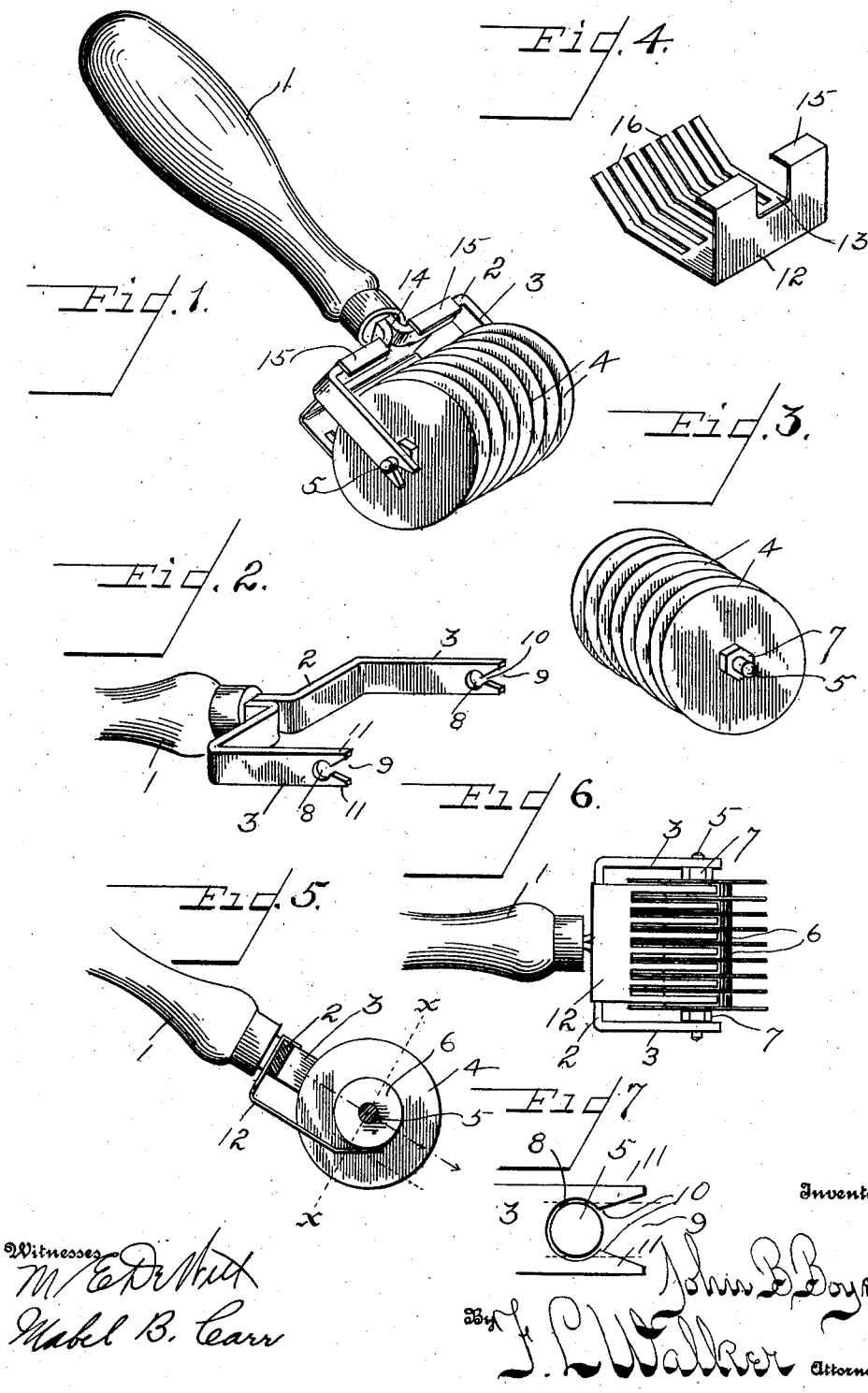
Witnesses
Inventor John B. Boyer
By J. L. Walker, Attorney

UNITED STATES PATENT OFFICE.

JOHN B. BOYER, OF DAYTON, OHIO, ASSIGNOR TO THE THOMAS MFG. CO., OF DAYTON, OHIO, A CORPORATION OF OHIO.

NOODLE-CUTTER.

963,682.  Specification of Letters Patent.  Patented July 5, 1910.

Application filed May 17, 1909. Serial No. 496,638.

*To all whom it may concern:*

Be it known that I, JOHN B. BOYER, a citizen of the United States, residing at Dayton, in the county of Montgomery and State of Ohio, have invented certain new and useful Improvements in Noodle-Cutters, of which the following is a specification.

My invention relates to culinary devices and more particularly to noodle cutters of a rotary type.

The object of the invention is to provide a device of this character which will greatly facilitate the cutting of rolled dough into long even strips for the purpose of making noodles.

One of the primary objects of the invention is to provide a construction in which the rotary cutters or knives may be easily and readily removed from the carrying frame for the purpose of cleaning and sharpening and whereby they may be returned to the frame without the necessity of adjusting or securing devices.

A further object is to provide simple and efficient means for retaining the rotary cutting blades in engagement with the carrying frame and to strip the severed strips of dough from the blades, thereby preventing the clogging of the device.

With the above primary and other incidental objects in view, as will more fully appear in the specification, the invention consists of the features of construction, parts and combinations thereof, their mode of operation, or their equivalents, as hereinafter described and set forth in the claims.

Referring to the drawing, Figure 1 is a perspective view of the assembled device.
Fig. 2 is a perspective detail view of the carrying frame with the rotary cutting blades and stripping fingers removed. Fig. 3 is a perspective view of the rotary cutting blades removed from the carrying frame.
Fig. 4 is a detail perspective view of the guard plate and stripping fingers. Fig. 5 is a side elevation partly in section showing the relation of the stripping fingers with the cutting blade and the extent and curvature of said fingers whereby they will assist in retaining the cutting blades in engagement with the carrying frame. Fig. 6 is a bottom plan view of the assembled device showing the relation of the various parts. Fig. 7 is an enlarged detail view of the journal bearing of the carrying frame.

Like parts are indicated by similar characters of reference throughout the several views.

Referring to the drawings, 1 is a handle preferably of wood carrying at its extremity the carrying frame 2 preferably rectangular in form and having forward extending arms 3 in which are journaled the rotary cutting blades 4. The cutting blades 4 comprise sharpened metallic disks mounted at regular intervals on an arbor or shaft 5. Interposed between the cutting blades 4 are washers or disks 6 which may be of wood or other material and which serve to space the cutting disks 4 regularly upon the shaft or arbor 5. At opposite ends the arbor 5 is provided with compression nuts 7 by which the cutting blades 4 and interposed disks 6
are retained upon the arbor. The arbor 5
of the cutting blades is journaled in the carrying frame 2 in such manner that it may be readily engaged with and disengaged therefrom.

To facilitate the engagement and disengagement of the arbor 5 with the carrying frame the arms 3 are provided with bearing recesses 8 intersected by a divergent notch 9. The bearing recesses 8 are of such dimension that the arbor 5 will rotate freely therein.
The divergent sides of the notch 9 form a throat 10 at their point of intersection with the bearing recess 8 which throat 10 is slightly less than the diameter of the arbor 5. It will be seen that the bearing recesses 8 and the diverging notches 9 form resilient fingers 11—11 at the extremity of each of the arms 3 of the carrying frame. In inserting the arbor 5 of the carrying blades the fingers 11 will be forced outward to a slight extent to permit the arbor to pass the throat 10. After the arbor has entered the bearing recess 8 the fingers 11 returning to their normal position through the resiliency of the metal will maintain the arbor in place. The retention of the arbor and blades in engagement with the carrying frame is further insured by the action of the resilient stripping fingers to be described.

Supported on the carrying frame 2 is a guard plate 12. This guard plate is preferably bent to substantially right angular form, and the upper edge is provided with a notch 13 to be engaged by the stem portion 14 of the carrying frame 2. The edges of the guard plate on opposite sides of the notch 13 being bent over the upper side of the carrying frame 2 as at 15 to secure the guard plate in place upon the frame. The forward portion of the guard plate 12 is slotted or notched to form a plurality of resilient stripping fingers or tines 16. The said resilient stripping fingers are adapted to extend between adjacent cutting blades or disks 4 and bear upon the intermediate disk or washer 6. The resilient stripping fingers 16 are curved at their forward extremity and extend beyond the central line $x-x$ of the cutting blades 4 and above the bottom level of the disk 6 as indicated by dotted lines in Fig. 5 thereby materially assisting in retaining the cutters in place in the frame. In removing the cutters from the frame and returning it thereto not only the resilient fingers 11 of the frame but also the resilient stripping fingers 16 of the guard plate are flexed and upon the return of the cutters to their position in the frame the resilient stripping fingers 16 engage the disk 6 at a point in advance of their pivotal connection and retain the parts in inter-engagement. The fingers 16 are adapted to strip the dough from the cutters and prevent the clogging of the device.

From the above description it will be apparent that there is thus provided a device of the character described, possessing the particular features of advantage before enumerated as desirable, but which obviously is susceptible of modification in its form, proportion, detail construction and arrangement of parts, without departing from the principle involved or sacrificing any of its advantages.

Having thus described my invention, I claim:

1. In a noodle cutter, a shaft, a plurality of cutting disks carried on said shaft, a carrying frame having forward extending arms bifurcated at their extremities to form two resilient fingers between which the shaft of said cutting disks is removably engaged, substantially as specified.

2. In a noodle cutter as described, a shaft, a plurality of cutting disks carried on said shaft, a bifurcated carrying frame, the arms of said frame being provided with bearing recesses for said shaft and having notches intersecting said bearing recesses and forming at the intersection of the notch and recess a constricted throat through which the shaft may be forced into the bearing recess and by which it will be therein retained, substantially as specified.

3. In a device of the character described, a shaft, a plurality of cutting disks carried on the shaft, a bifurcated carrying frame, each arm of which is in turn bifurcated, journal bearings for the shaft located in the bifurcated extremities of the respective arms of the frame within which the extremities of the shaft engage and rotate, and means for maintaining the shaft in engagement with the bifurcated extremities of the frame arms, substantially as specified.

4. In a noodle cutter as described, a shaft, a plurality of cutting disks carried on said shaft, a plurality of disks also on said shaft and interposed between the successive cutting disks, a carrying frame having bifurcated arms, within the bifurcations of which the shaft is adapted to engage, a guard plate carried on the carrying frame and having a plurality of stripping fingers projecting between the cutting disks, the said stripping fingers extending to a point beyond the shaft of the cutting disks and being curved upward at their extremities above the bottom of the interposed disks, whereby the shaft of the cutting disks can only be withdrawn from the bifurcations of the frame arms by flexing the stripping fingers and whereby the said fingers will tend to retain the shaft in engagement with the bifurcations of the carrier arms, substantially as specified.

In testimony whereof, I have hereunto set my hand this 10th day of May A. D. 1909.

JOHN B. BOYER.

Witnesses:
MABEL B. CARR,
F. L. WALKER.